United States Patent
Ohmura et al.

[11] Patent Number: 5,901,869
[45] Date of Patent: May 11, 1999

[54] TANK CAP WITH LOCK OF FUEL TANK AND METHOD OF PACKING THE SAME

[75] Inventors: Shunsuke Ohmura; Takayoshi Mizuno, both of Shizuoka, Japan

[73] Assignee: Asahi Densi Co., Ltd., Shizuoka, Japan

[21] Appl. No.: 08/893,035

[22] Filed: Jul. 15, 1997

[30] Foreign Application Priority Data

Jul. 15, 1996 [JP] Japan .................................. 8-205225
Mar. 5, 1997 [JP] Japan .................................. 9-069218

[51] Int. Cl.⁶ .................................................. B65D 55/14
[52] U.S. Cl. ............................... 220/210; 220/DIG. 33; 53/445; 53/474; 206/223
[58] Field of Search ................................. 220/86.1, 86.2, 220/210, DIG. 33, 254, 256, 259; 53/445, 474; 206/223

[56] References Cited

U.S. PATENT DOCUMENTS

| | | |
|---|---|---|
| 3,136,148 | 6/1964 | Nehls . |
| 3,945,454 | 3/1976 | Kinoshita et al. ............ 220/210 X |
| 4,160,511 | 7/1979 | Hukuta et al. ............... 220/210 |
| 4,231,240 | 11/1980 | Fujita et al. ............... 220/210 X |
| 4,390,107 | 6/1983 | Hukuta ....................... 220/210 X |
| 4,579,244 | 4/1986 | Fukuta ....................... 220/210 X |
| 4,984,698 | 1/1991 | Stuckey ...................... 220/210 X |

FOREIGN PATENT DOCUMENTS 1262388  9/1961  France .
55-143263 11/1980 Japan .
2048225 12/1980 United Kingdom ............... 220/210

Primary Examiner—Stephen K. Cronin
Assistant Examiner—Nathan Newhouse
Attorney, Agent, or Firm—Sughrue, Mion, Zinn, Macpeak & Seas, PLLC

[57] ABSTRACT

A tank cap with a lock of a fuel tank comprises: a gasket member (2) for sealing a fuel supply port of the fuel tank; an locking member (3) arranged in a periphery of the fuel supply port; and a slider (4) arranged between the gasket member and the locking member. The slider (4) moves in conjunction with the gasket member, in such a manner that the locking member is prevented from moving in the transverse direction when the gasket member moves in a closing direction in which the gasket member comes close to the locking member, that the locking member is capable of moving in the transverse direction when the gasket member moves in a separating direction in which the gasket member is separate from the locking member, and that the locking member is maintained in a maintaining state in which the stopper is kept intruded into the moving passage of the locking member, even if the gasket member moves in the separating direction, when the locking member is prevented from moving in the transverse direction. In addition to this, for example, a temporary assembling cap (102) is incorporated between the outer circumference of the gasket member and the outer circumference of the locking member of the tank cap with a lock. Therefore, the tank cap with a lock can be packed while the key is withdrawn from the tank cap.

8 Claims, 8 Drawing Sheets

TANK CAP WITH LOCK OF FUEL TANK AND METHOD OF PACKING THE SAME

BACKGROUND OF THE INVENTION

The present invention relates to a tank cap with a lock which is attached to a fuel supply port of a fuel tank. In addition, the present invention also relates to a method of packing the tank cap with a lock.

Conventionally, a tank cap with a lock, which can be removed from a fuel supply port only when it is unlocked by a predetermined key, is used for the fuel supply port of a fuel tank of a motorcycle. This tank cap with a lock is disclosed, for example, in Japanese Examined Patent Publication No. 58-48423. This tank cap with a lock is arranged with the intention of preventing the key from withdrawing from the key hole of the tank cap in a state that the tank cap is being removed from the fuel tank.

When the tank cap is attached to the fuel supply port, a gasket member is brought into close contact with the peripheral edge portion of the fuel supply port and simultaneously a locking piece of the tank cap with a lock automatically protrudes in the transverse direction by the action of a spring incorporated into the tank cap with a lock. Then the locking piece of the tank cap with a lock is locked with the peripheral edge portion of the fuel supply port, so that the tank cap is put into a locked condition. In this locked condition, the key can be withdrawn from the key hole.

Unless the tank cap is unlocked by the key, it is impossible to remove the tank cap with a lock from the fuel supply port. In order to remove the tank cap with a lock from the fuel supply port, it is necessary that the key is inserted into the key hole of the tank cap and turned. Due to this operation, the locking piece can be unlocked from the peripheral edge portion of the fuel supply port. In this way, the tank cap with a lock can be removed from the fuel tank.

The above-mentioned conventional tank cap with a lock is designed, in such a manner that it is impossible to withdraw the key from the key hole in the removed state in which the tank cap with a lock is being removed from the fuel tank. Namely, in the conventional tank cap with a lock, the tank cap is made with the intention of preventing the key from withdrawing from the tank cap when the tank cap is being removed from the fuel tank.

However, according to the arrangement of the above tank cap, there is a possibility that the key can be withdrawn from the key hole in a state that the tank cap is being removed from the fuel tank as follows. In the case where a gasket member is pushed up by a hand while the tank cap with a lock is being removed from the fuel tank, an elevating cylinder of the tank cap with a lock is raised in cooperation with the movement of the gasket member, and then the locking piece is unlocked from the stopper surface of the elevating cylinder and protrudes outside. Therefore, the key can be withdrawn from the tank cap.

As described above, in the conventional example of the tank cap with a lock, when the gasket member is pushed up somehow, the key is withdrawn from the tank cap, so that there is a possibility that the key thus withdrawn is lost.

SUMMARY OF THE INVENTION

The present invention has been accomplished to solve the above problems.

It is an object of the present invention to provide a tank cap with a lock in which it is not easy to withdraw a key from a tank cap with a lock in the state in which the tank cap is removed from the fuel supply port of the fuel tank.

It is an another object of the invention described in to provide a method of packing a tank cap with a lock in which the bulk and damage of the tank cap can be reduced and the deformation of the key for the tank cap with a lock can be prevented when it is packed or shipped.

The above-mentioned object can be accomplished by a tank cap with a lock which is coupled with a fuel supply portion of fuel tank comprising:

a pillar-shaped portion;

a gasket member movably mounted on the pillar-shaped portion in an axial direction of the pillar-shaped portion for sealing the fuel supply port;

a locking member movably mounted on the pillar-shaped portion in a transverse direction of the pillar-shaped portion for securing the tank cap with a lock to the fuel tank;

a slider disposed between the gasket member and the locking member and slidable in the axial direction in conjunction with the movement of the gasket member; and a spring mounted on the pillar-shaped portion for urging the slider against the gasket member;

wherein the slider is provided with a stopper capable of intruding into a moving passage of the locking member, in such a manner that the locking member is prevented from moving in the transverse direction when the gasket member moves in a closing direction in which the gasket member comes close to the locking member;

that the locking member is capable of moving in the transverse direction when the gasket member moves in a separating direction in which the gasket member is separate from the locking member; and that the locking member is maintained in a maintaining state in which the stopper is kept intruded into the moving passage of the locking member, even if the gasket member moves in the separating direction, when the locking member is prevented from moving in the transverse direction.

In the above-mentioned tank cap with a lock according to the present invention, the construction thereof may be modified in such a manner that the slider is also provided with a rod-shaped body, and the stopper is made into L-shape and formed at the center of the rod-shaped body, in which a portion of the L-shaped stopper is intruded into the moving passage of the locking member when the gasket member moves in the closing direction, and the portion of the L-shaped stopper is clamped between the locking member and the pillar-shaped portion in the maintaining state.

According to the above-mentioned arrangements, when the tank cap with a lock into which the key is inserted is attached to the fuel supply port of the fuel tank, the gasket member is moved by the fuel supply port of the fuel tank in the direction in which the gasket member is separate from the locking member, and the slider is moved in conjunction with the gasket member, so that the movement of the locking member is allowed. Accordingly, the locking member is protruded outwardly in the transverse direction and engaged with the fuel supply port of the fuel tank. In the above state in which the tank cap with a lock is attached to the fuel tank, it is possible to withdraw the key from the tank cap with a lock. After the key has been withdrawn out from the tank cap, it is inserted into the main switch. Then it becomes possible to drive a motorcycle.

When the tank cap with a lock is removed from the fuel tank so as to refuel the fuel tank, the key is inserted into the key hole and fully turned clockwise. In accordance with the turn of the key, the locking members, which have been protruded outwardly in the transverse direction, are retracted, and the gasket member is moved in the direction of the locking member. Accordingly, the tank cap with a lock can be removed from the fuel supply port of the fuel tank while the key is inserted into the key hole of the tank cap. Even when the gasket member is pushed up by a hand while the tank cap with a lock is removed from the fuel tank, the movement of the slider is restricted by the stopper. Therefore, the locking members are not protruded outside. Accordingly, it is impossible to withdraw the key from the tank cap.

In the above-mentioned tank cap with a lock according to the present invention, the construction thereof may be modified in such a manner that said tank cap with a lock further comprises:

a temporary assembling cap attached on the outer periphery of the pillar-shaped body disposed between the gasket member and the locking member in the axial direction, wherein the profile of the temporary assembling cap is substantially the same as that of the fuel supply port of the fuel tank, and wherein the temporary assembling cap is capable of switching the locking member from the maintaining state to a releasing state in which the locking member is movable into the transverse direction when the temporary assembling cap has just attached on the outer periphery of the pillar-shaped body.

Due to the above arrangement, by the action of the temporary assembling cap, the gasket member is moved in the direction in which the gasket member is separate from the locking member. Therefore, the locking member is protruded outwardly in the transverse direction and engaged with the temporary assembling cap. By this temporary assembling cap, it is possible to provide the same state in which the tank cap with a lock is attached to the fuel supply port of the fuel tank. Accordingly, it is possible to withdraw the key from the tank cap with a lock. Therefore, it is possible to separately pack and deliver the key and the tank cap with a lock.

The above-mentioned another object can be accomplished by a method of packing a tank cap with a lock according to the present invention which including: a gasket member for sealing a fuel supply port of a fuel tank; an locking member to be engaged with a periphery of the fuel supply port; and a lock, in which a key can be inserted into and withdrawn from the key hole of the lock in accordance with a positional relation between the gasket member and the locking member, the method of packing a tank cap with a lock comprising the steps of: attaching a temporary assembling cap, the profile of which is substantially the same as that of the fuel supply port of the fuel tank, between the peripheries of the gasket member and the locking member; withdrawing a key from the key hole of the lock by changing a positional relation of the gasket member with the locking member; and packing the key and the tank cap with the lock in the above state.

The above-mentioned another object can also be accomplished by a method of packing a tank cap with a lock which is coupled with a fuel supply portion of fuel tank comprising: a pillar-shaped portion; a gasket member movably mounted on the pillar-shaped portion in an axial direction of the pillar-shaped portion for sealing the fuel supply port; an locking member movably mounted on the pillar-shaped portion in a transverse direction of the pillar-shaped portion for securing the tank cap with a lock to the fuel tank; a slider disposed between the gasket member and the locking member and slidably movable in the axial direction in conjunction with the movement of the gasket member; and a spring mounted on the pillar-shaped portion for urging the slider against the gasket member; wherein the slider is provided with a stopper capable of intruding into a moving passage of the locking member, the method comprising the steps of:

preparing a temporary assembling cap the profile of which is substantially the same as that of the fuel supply port of the fuel tank;

attaching the temporary assembling cap to the outer periphery of the pillar-shaped body disposed between the gasket member and the locking member in the axial direction;

withdrawing a key from the tank cap with a lock by changing a positional relation of the gasket member with the locking member; and packing the key thus withdrawn and the tank cap with a lock in the state in which the key is physically separated from the tank cap with a lock.

The above-mentioned methods according to the present invention can provide the following advantages. When the temporary assembling cap is attached to the tank cap with a lock, the positional relation of the gasket member with the locking member is set so that the key can be withdrawn from the lock. Accordingly, it becomes possible to withdraw the key from the key hole of the tank cap with a lock. When the key and the tank cap with a lock are separately packed, it is possible to prevent the deformation of the key in the process of packing, and it is also possible to prevent the bulk of packing.

BRIEF DESCRIPTION OF THE DRAWINGS

FIG. 5 is a cross-sectional view taken on line B—B in FIG. 1, wherein FIG. 5 shows an intermediate state in which the tank cap is attached to the fuel supply port;

FIG. 6 is a cross-sectional view taken on line B—B in FIG. 1, wherein FIG. 6 shows a state in which the tank cap is attached to the fuel supply port;

FIG. 7 is a cross-sectional view taken on line B—B in FIG. 1, wherein FIG. 7 shows a state in which the tank cap is removed from the fuel supply port;

FIGS. 8(a)–8(c) are planned views showing a movement of the locking member, wherein FIG. 8(a) is a view showing a state in which the tank cap with a lock is attached to the fuel supply port, FIG. 8(b) is a view showing a state in which the key is fully turned clockwise, and FIG. 8(c) is a view showing a state in which the tank cap with a lock is removed from the fuel supply port;

FIG. 9 is a cross-sectional view similar to FIG. 4, wherein FIG. 9 shows another example of the tank cap with a lock of the present invention;

DETAILED DESCRIPTION OF THE PREFERRED EMBODIMENTS

Referring to the accompanying drawings, an embodiment of the present invention will be specifically explained as follows.

Figure 1:
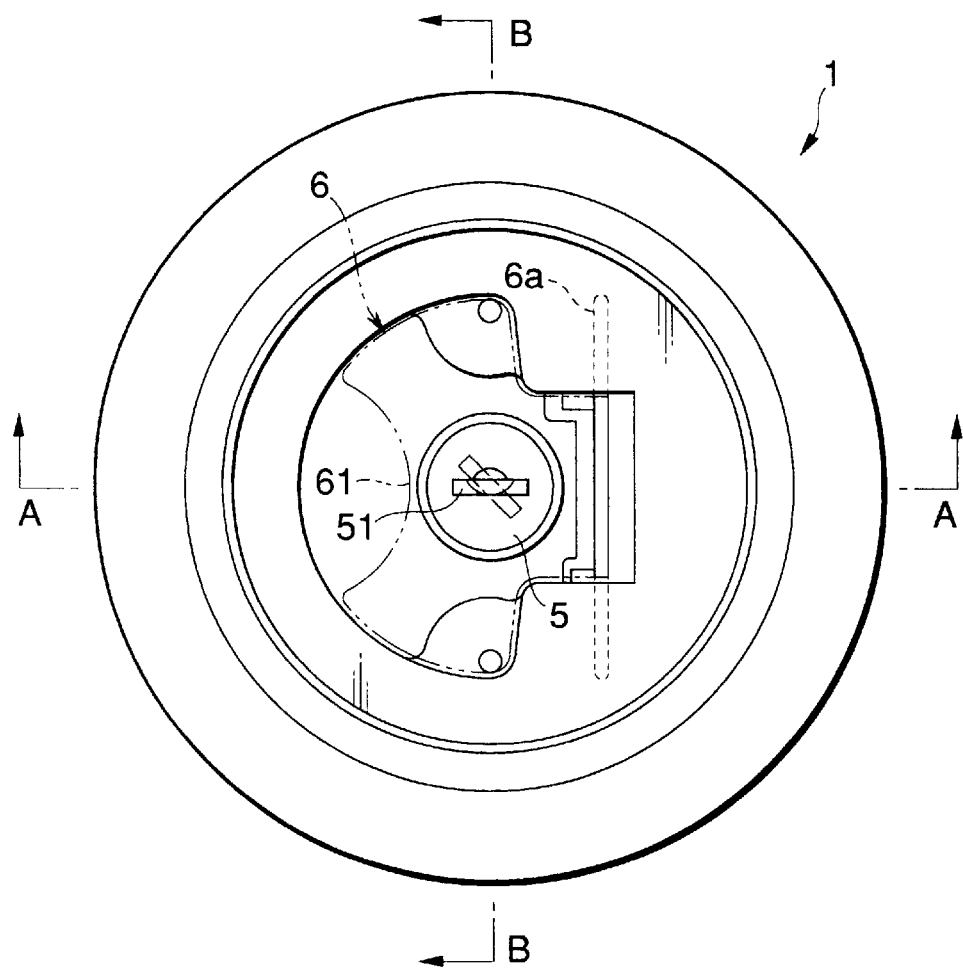
FIG. 1 is a plan view showing an example of the tank cap with a lock of the present invention.
Figure 2:
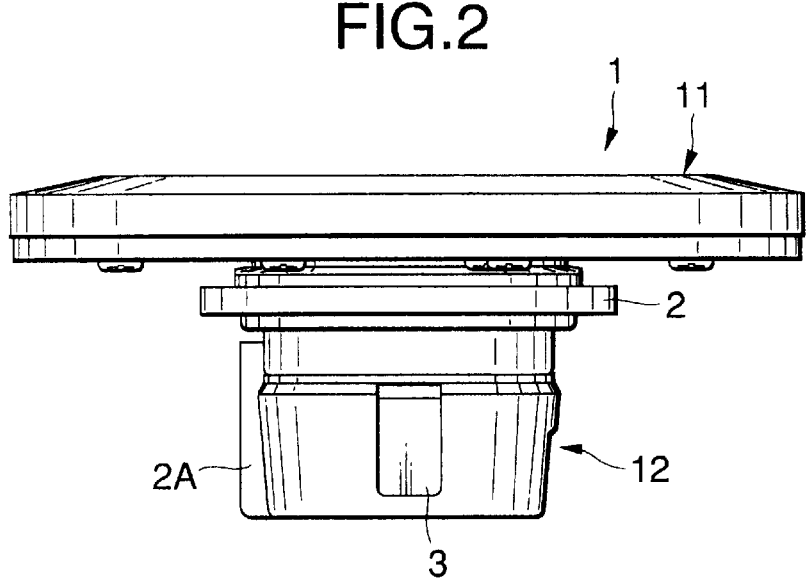
FIG. 2 is a front view of the tank cap with a lock shown in FIG. 1.

As illustrated in FIGS. 1 and 2, the tank cap with a lock 1 of this example includes: a disk-shaped portion 11 of a large diameter arranged at an upper position; and a pillar-shaped portion 12 of a small diameter arranged at a lower position. As illustrated by a two-dotted chain line in FIG. 1, there is provided a cover 6, the right end portion of which is pivoted by a pivot shaft 6a, on the upper surface of the disk-shaped portion 11. The cover 6 is urged by a spring (not shown) wound around the pivot shaft 6a so as to cover a key hole 51 of a lock 5 at all times. There is provided a finger catching portion 61 at the left end of this cover 6. When a user catches this finger catching portion 61 with his finger, the cover 6 can be easily opened. Only when the key hole 51 is set in the direction of line A—A shown in FIG. 1, the key can be inserted into and withdrawn from the key hole 51.

Figure 3:
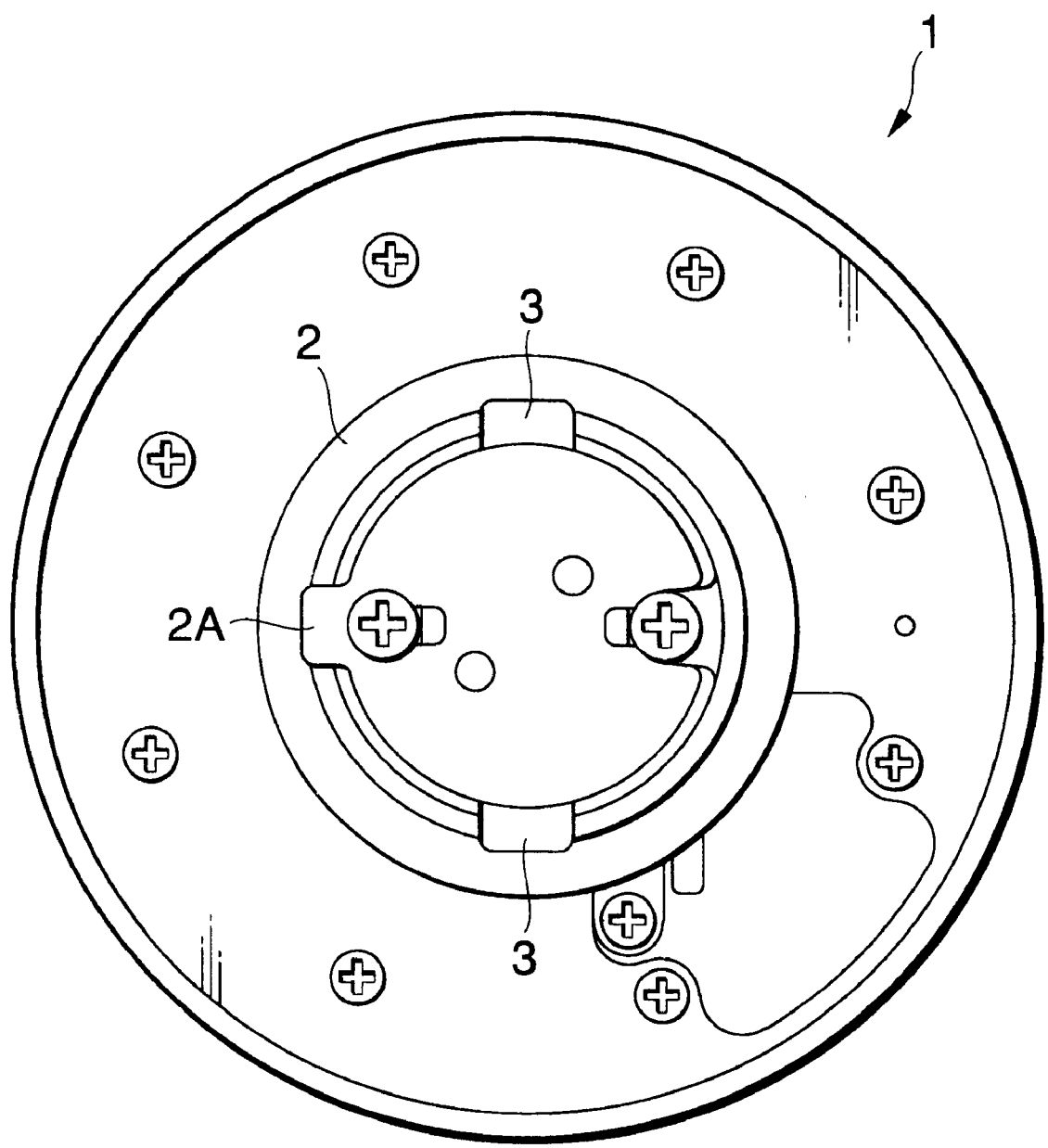
FIG. 3 is a bottom view of the tank cap with a lock shown in FIG. 1.

As illustrated in FIGS. 2 and 3, the pillar-shaped portion 12 is provided with a pair of locking members 3 which are arranged symmetrically with respect to the axis of the tank cap with a lock 1. These locking members 3 can be respectively moved in the transverse direction, that is, these locking members 3 can be respectively moved in the direction perpendicular to the axis of the tank cap with a lock 1. When a view is taken from the front with respect to the moving direction of the locking member 3, it is rectangular. When a view is taken in the direction perpendicular to the moving direction of the locking member 3, it is triangular and its upper end is protruded outwardly. In the upper portion of the pillar-shaped portion 12, there is provided a flange-shaped gasket member 2. This gasket member 2 is capable of moving in the longitudinal direction, that is, this gasket member 2 is capable of moving in the direction parallel with the axis of the tank cap with a lock 1.

In following explanations, the longitudinal direction is the same as the vertical direction for reasons of convenience.

Figure 4:
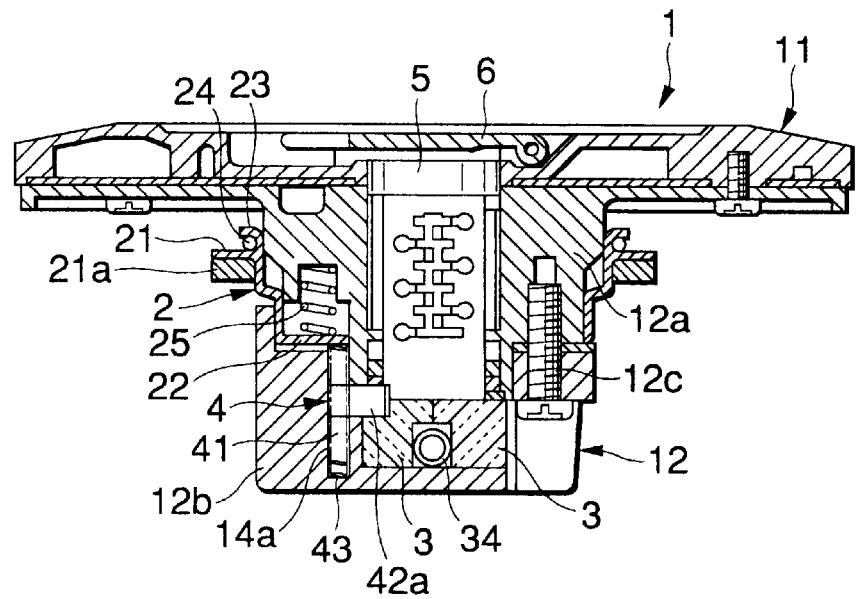
FIG. 4 is a cross-sectional view taken on line A—A in FIG. 1.

As illustrated in FIG. 4, the gasket member 2 is composed of a metallic cylindrical body having step portions. An upper end of the gasket member 2 is formed into a flange portion 21 which protrudes outside in the radial direction. A lower end of the gasket member 2 is formed into a flange portion 22 which protrudes inside in the radial direction at four positions on the circumference. A gasket 21a made of synthetic rubber is made to adhere onto the flange portion 21 at the upper end. On the upper side of the flange portion 21 at the upper end, there is provided a curved portion 23, the outer circumferential side of which is formed into a recess portion. An annular coil spring 24 is engaged in this recess portion, so that the curved portion 23 is urged and fastened inside in the radial direction by this coil spring 24.

The four springs 25 which are distributed at a predetermined interval in the circumferential direction of the pillar-shaped portion 12 and used for urging the gasket member 2, are attached to the upper body 12a of the pillar-shaped portion 12, so as to push downward the flange portion 22 located at the lower ends thereof. Therefore, when the springs 25 used for the gasket member 2 are expanded and contracted, the gasket member 2 is moved upward and downward. At this time, the inner circumference of the curved portion 23 is brought into slide-contact with the pillar surface of the upper body 12a.

Figure 5:
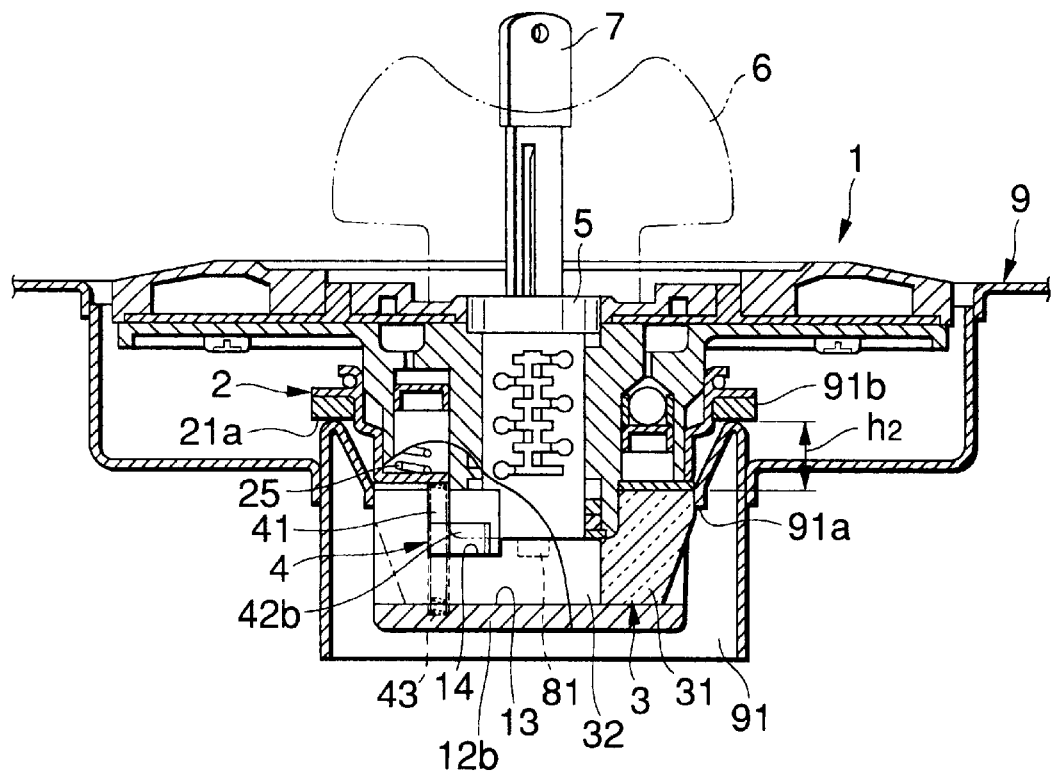

As illustrated in FIG. 4, a lower body 12b is fastened to the upper body 12a by two screws 12c (only one of which is shown). A profile of this lower body 12b is a pillar-shape, the upper portion of which is open upward. As illustrated in FIG. 5, on the upper surface of the lower body 12b, there is formed a groove portion 13 which penetrates in the radial direction. A central portion of this groove portion 13 is extended into a substantial triangle as illustrated in FIGS. 8(a)–(c).

The pair of locking members 3 are incorporated into this groove 13. As clearly shown in FIGS. 8(a) and 8(b), each of these locking members 3 are composed of a substantial square end portion 31 located outside of the pillar-shaped portion 12 and a base portion 32 located inside thereof. The pair of the substantial square end portions 31 of the locking members 3 are arranged on a line L defined by a diameter of the pillar-shaped portion 12 when a view is taken from the upper position. In addition, as also shown in FIG. 8(a) and 8(b), one of the base portions 32 of the locking member 3 is arranged on either side of the line L and the other one of the base portions 32 is arranged on other side of the line L, in such a manner that the base portion 32 is shifted from the aforementioned one end portion 31. With this arrangement of the locking members 3, the pair of locking members 3 can be respectively slid in the radial direction of the pillar-shaped portion 12.

Figure 6:
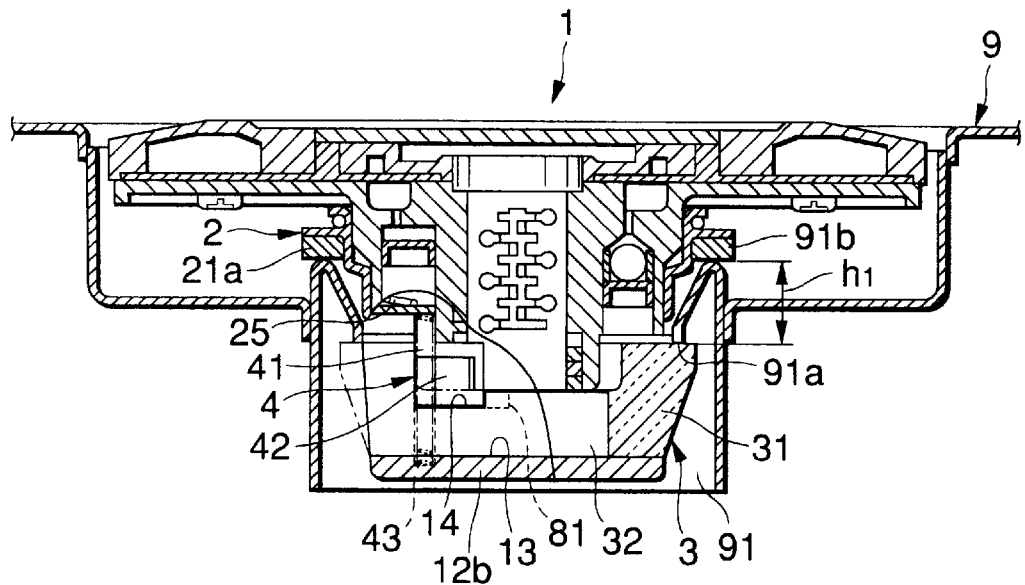
Figure 7:
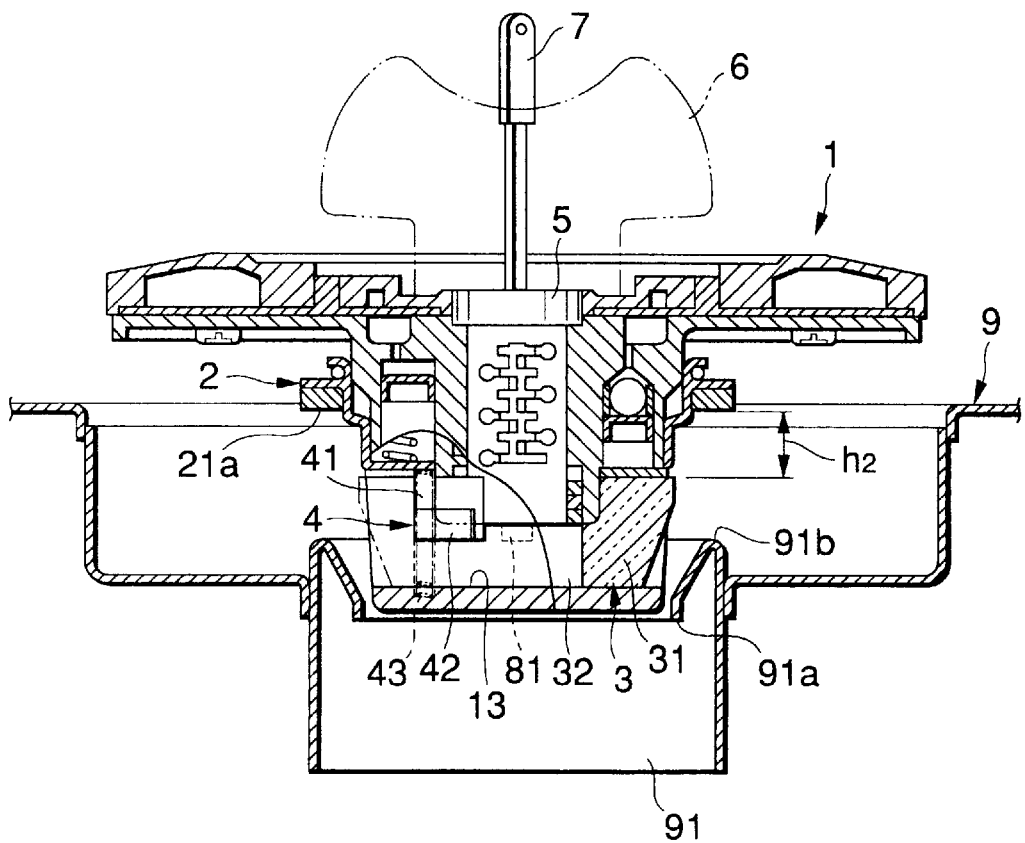

As shown in FIGS. 6 and 7, the height of the base portion 32 of the locking member 3 is made lower than that of the end portion 31. As illustrated in FIGS. 8(a)–(c), there is formed an elliptical engaging hole 33 in the base portion 32. Into this engaging hole 33, one of the pair of pillar-shaped engaging pins 81, arranged on the bottom surface of a rotor (not shown) located immediately above the base portion 32 of the locking member 3, is idly engaged. The above rotor is rotated integrally with the key inserted into the key hole 51 of the lock 5.

Figure 8A:
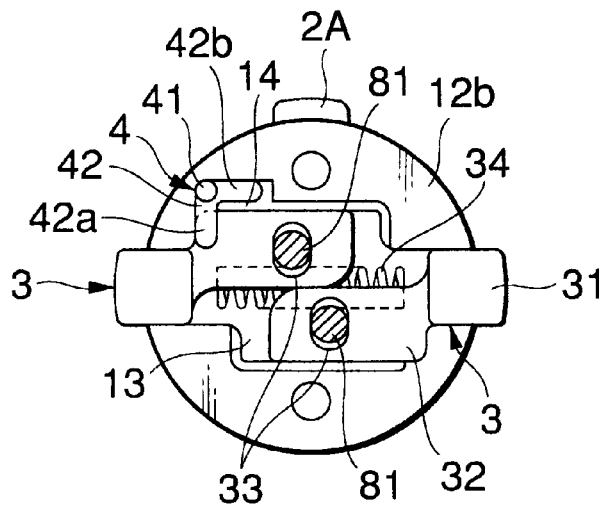
Figure 8B:
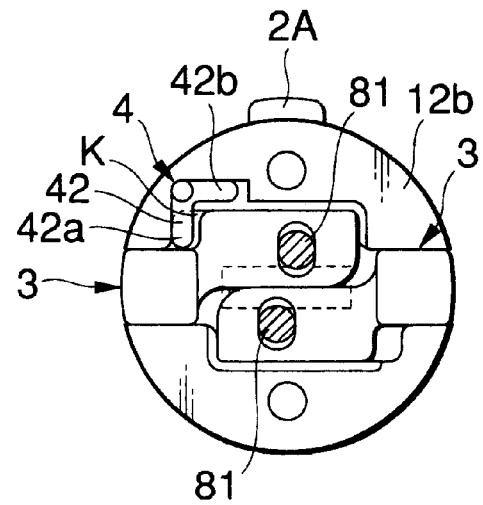
Figure 8C:
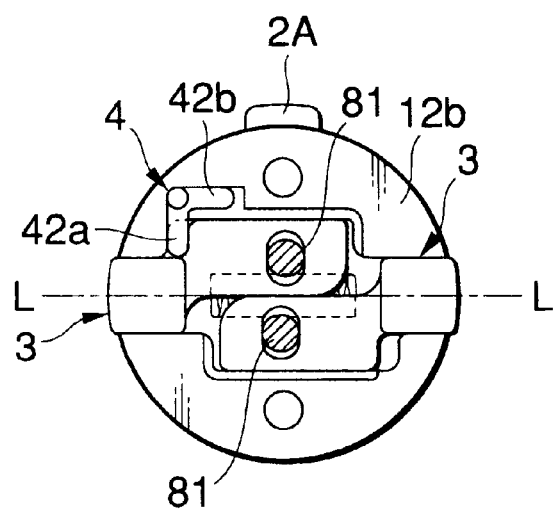

As shown by a broken line in FIGS. 8(a)–(c) and also shown in FIG. 4, a corner on the side of the bottom portion of the locking member 3, which is faced with the opponent locking member 3, is cut away, so that the cross-section of the locking member 3 in a range from the other end portion to the middle of the end portion 31 is formed into a rectangle. In this way, the cut-away portions of the pair of locking members 3 compose a long and slender space, the cross-section of which is substantially square. In this long and slender space, as illustrated in FIGS. 4 and 8(a)–(c), there is provided a spring 34 used for the locking member. By the action of this spring 34, the pair of locking members 3 repel each other in the opposite direction.

As illustrated in FIGS. 4, 6 and 8(a)–(c), one corner of the groove 13 in the lower body 12b is formed into a shelf portion 14 in which the wall is slightly retracted and the bottom surface thereof is located higher than the groove portion 13. In this shelf portion 14, there is formed a circular hole 14a at the corner thereof. In this circular hole 14a, there is provided a spring 43 which is to be utilized for a slider 4 explained later. The spring 43 is accommodated in the circular hole 14a and then a lower end portion of the slider 4 is inserted into this hole so as to put on the spring 43.

As illustrated in FIGS. 6 and 8, the slider 4 is composed in such a manner that an L-shaped stopper 42 is provided at the center of a rod-shaped body 41. This L-shaped stopper 42 is composed in such a manner that a left plate-shaped stopper 42a and a right plate-shaped stopper 42b are respectively protruded from the rod-shaped body 41 in two directions perpendicular to each other. A lower end of the rod-shaped body 41 is idly engaged in the circular hole 14a in which the spring 43 used for the slider 4 is provided. Therefore, when the spring 43 is expanded or contracted, the slider 4 is capable of moving upward or downward.

In this arrangement, as shown in FIG. 5, the height of the shelf portion 14 of the lower body 12b is determined, in such a manner that the shelf portion 14 of the lower body 12b is lower than the upper surface of the base portion 32 of the locking member 3 and that the stopper 42 does not collide with this shelf portion 14 even when the slider 4 is lowered to the lower limit.

As shown in FIGS. 8(a)–(c), the back surface of the L-shaped stopper 42 of the slider 4 comes into contact with two walls, which are met at right angle, of the groove portion 13 and the shelf portion 14 of the lower body 12b. An upper end of the rod-shaped body 41 is pushed against the flange portion 22 at the lower end of the gasket member 2 by the elastic force of the spring 43.

An intensity of the upward elastic force of the spring 43 is designed to be much smaller than the downward elastic force of the four springs 25 for urging the gasket member 2. When the locking member 3 is fully retracted inside, as illustrated in FIG. 8(b), a clearance K is formed because a distance between the wall of the lower body 12b and the shoulder portion of the locking member 3 is larger than the thickness of the left stopper 42a.

Next, the operation of the tank cap with a lock of this example will be explained below.

FIGS. 6 and 8(a) are views showing a state of the tank cap with a lock 1 of this example which is attached to the fuel supply port 91 of the fuel tank 9. In this state, portions of the pair of locking members 3 are protruded on both sides, and upper surfaces of the pair of locking members 3 are engaged with an engaging edge 91a arranged in the deep portion of the fuel supply port 91. At this time, the key 7 can be withdrawn from the key hole 51.

In addition to this, as also shown in FIGS. 6 and 8(a), the gasket member 2 is brought into close-contact with an edge portion 91b which is arranged close to the inlet of the fuel supply port 91. Therefore, this gasket member 2 is pushed upwardly by the edge portion 91b against an elastic force of the springs 25. As a result, the fuel supply port 91 can be tightly sealed between the gasket 21a and the edge portion 91b for sealing by the downward elastic force of the springs 25. In this connection, clearance $h_1$ defined between the lower surface of the gasket 21a and the upper surface of the locking member 3 is, for instance, made of 11 mm in this example.

In the above state, the slider 4 is raised together with the gasket member 2 by the elastic force of the spring 43 installed in the circular hole 14a, and the stopper 42 is located at a position higher than the upper surface of the base portion 32 of the locking member 3 as illustrated in FIG. 6. Therefore, the stopper 42 is not brought in contact with the locking member 3. Accordingly, as illustrated in FIG. 8(a), while the locking member 3 is not blocked by the stopper 42, it moves outside by the action of the spring 34 used for the locking member until the locking member 3 collides with the wall of the lower body 12b. The tank cap with a lock 1 which has been attached to the fuel supply port 91 in this state can not be removed unless the key 7 is used. In order to remove the tank cap with a lock 1 from the fuel supply port 91 in the above state, it is necessary to insert the key 7 into the key hole 51 of the lock 5 and fully turn the key 7 clockwise. Due to the foregoing, as illustrated in FIG. 8(b), the pair of locking members 3 are respectively moved in the opposite direction by the engaging pin 81 of the rotor against the elastic force of the spring 34 used for the locking member. Therefore, the end portions 31 protruding from the side of the lower body 12b are respectively retracted.

As shown in FIGS. 5 and 8(b), when the locking members 3 are retracted from the side of the lower body 12b, engagement of the locking members 3 with the engaging edge 91a of the fuel supply port 91 is released. Therefore, the gasket member 2 is pushed downward by the downward elastic force of the springs 25 used for the gasket member. However, since the gasket 21a comes into contact with the edge portion 91b for sealing of the fuel supply port 91, the overall tank cap with a lock 1 is pushed upwardly by the elastic force of the spring 25 used for the gasket member as illustrated in FIG. 5. In the above state, the gasket member 2 is lowered to the lower limit position. In this connection, clearance $h_2$ between the lower surface of the gasket 21a and the upper surface of the locking member 3 is 8.8 mm in this example.

When the gasket member 2 is lowered as described above, the locking members 3 are fully retracted inside the lower body 12b. Therefore, as illustrated in FIG. 8(b), there is provided a clearance K, because a distance between the locking members 3 and the wall of the lower body 12b is made larger than the thickness of the left stopper 42a of the slider. Accordingly, there is no possibility of collision of the stopper 42 with the locking members 3 even when the stopper 42 is lowered.

The height of the shelf portion 14 of the lower body 12b is smaller than that of the base portion 32 of the locking member 3. Further, the height of the shelf portion 14 of the lower body 12b is determined so that the right stopper 42b can not collide with the upper surface of the shelf portion 14 even when the slider 4 is lowered to the lower limit position. Accordingly, even when the gasket member 2 is lowered as described above, there is no possibility of collision of the stopper 42 with the upper surface of the shelf portion 14. When the gasket member 2 is lowered, the slider 4 is lowered being pushed by the gasket member 2. In this case, the slider 4 can be lowered to the lower limit position without being blocked. Due to the foregoing, the gasket member 2 can be also lowered to the lower limit position smoothly.

As illustrated in FIG. 5, when the tank cap with a lock 1 is raised at the fuel supply port 91, a force given to the key 7 to turn it clockwise is removed. Then, the pair of locking members 3 repel each other by the elastic force of the spring 34, so that the locking members 3 tend to move outside. As a result, a counterclockwise torque is given to the rotor via the engaging pin 81. Therefore, the key 7 inserted into the key hole 51 tends to turn counterclockwise.

However, at this time, the slider 4 has already been lowered to the lower limit position. Accordingly, as illustrated in FIG. 8(c), the left stopper 42a intrudes into the moving passage of the locking member 3, that is, the left stopper 42a intrudes between the shoulder portion of the locking member 3 and the wall of the lower body 12b. Due to the foregoing, the locking member 3 can not be moved any more, and the locking member 3 can not be returned to the initial position (the position shown in FIG. 8(a)) where the locking member 3 comes into contact with the lower body 12b.

Accordingly, the key 7 inserted into the key hole 51 can not be returned to the inserting and withdrawing position (the position shown by line A—A in FIG. 1). Therefore, it is impossible to withdraw the key 7 from the key hole 51. As a result, as illustrated in FIG. 7, while the key 7 is attached to the tank cap with a lock 1, the tank cap with a lock 1 is removed from the fuel supply port 91. In this case, the attaching angle of the key 7 with respect to the key hole 51 is slightly different from the normal attaching angle.

The tank cap with a lock 1 having the key 7 can be attached to the fuel supply port 91 again in such a manner that the tank cap with a lock 1 having the key 7 is set at the fuel supply port 91 as illustrated in FIG. 5 and pushed as it is. Before the tank cap with a lock 1 is pushed into the fuel supply port 91, the locking member 3 and the slider 4 are set in the state illustrated in FIG. 8(c), and the locking members 3 are slightly protruded from the side of the lower body 12b.

Accordingly, when the tank cap with a lock 1 is pushed against the fuel supply port 91, the locking members 3 come into contact with the inner circumference of the engaging edge 91a of the fuel supply port 91, and the locking members 3 are pushed by a small amount against the elastic force of the spring 34 used for the locking member. Due to the foregoing, the slider 4 is released from a state (shown in FIG. 8(c)) in which the left stopper 42a is interposed between the shoulder portion of the locking member 3 and the lower body 12b, that is, the slider 4 is put into the state shown in FIG. 8(b). Accordingly, the slider can be moved upward by the elastic force of the spring 43 used for the slider.

When the tank cap with a lock 1 is further pushed from the position shown in FIG. 5 towards the fuel supply port 91, the gasket 21a of the tank cap with a lock 1 comes into contact with the edge portion 91b of the fuel supply port 91. Accordingly, the gasket member 2 is pushed upward against the elastic force of the springs 25. When the gasket member 2 reaches the substantial upper limit position, the upper surface of the locking member 3 is lowered to a deep portion exceeding the engaging edge 91a of the fuel supply port 91.

When the gasket member 2 has reached the substantial upper limit position, the slider 4 also reaches the upper limit position while it is pushed upward by the elastic force of the spring 43. Accordingly, the left stopper 42a is located at a position higher than the upper surface of the base 32 of the engagement member 3. This position is illustrated in FIG. 6.

Accordingly, as illustrated in FIGS. 6 and 8(a), the engagement member 3 is moved to a position at which it comes into contact with the wall of the lower body 12b. The end portion 31 protrudes from the side of the lower body 12b, and its upper surface is engaged with the engaging edge 91a of the fuel supply port 91. Due to the foregoing, the gasket 21a of the tank cap with a lock 1 and the edge portion 91b of the fuel supply port 91 are closely contacted with each other by the elastic force of the springs 25, so that the fuel supply port 91 can be tightly sealed.

Simultaneously when the pair of locking members 3 are completely returned to the initial positions, the rotor is turned counterclockwise to the initial position via the engaging pin 81. The key 7 is also turned counterclockwise to the inserting and withdrawing position. Accordingly, the key 7 can be withdrawn from the key hole 51 in this state.

According to the tank cap with a lock 1 of this example composed as described above, when the tank cap with a lock 1 is removed from the fuel supply port 91 of the fuel tank 9, it is impossible to return the key 7 to the inserting and withdrawing position (the position indicated by line A—A in FIG. 1). Therefore, the key 7 can not be withdrawn from the tank cap with a lock 1 which has been removed from the fuel supply port 91.

Concerning the tank cap with a lock 1 of this example, even if the gasket member 2 is pushed upward by a hand after the tank cap with a lock 1 has been removed from the fuel tank 9, it is impossible to withdraw the key 7 from the tank cap with a lock 1. The reason is described as follows. In the case where the gasket member 2 is pushed upward by a hand after the tank cap with a lock 1 has been removed from the fuel tank 9, since the stopper 42 of the slider 4 is interposed between the shoulder portion of the locking member 3 and the wall of the lower body 12b by the elastic force of the spring 34 for the locking member as illustrated in FIG. 8(c), the slider 4 can not be moved upward by the frictional force caused between them.

Therefore, the locking members 3 can not be still moved outside, and the key 7 can not be returned to the inserting and withdrawing position (the position indicated by line A—A in FIG. 1). Accordingly, the tank cap with a lock 1 of this example is advantageous in that the possibility of withdrawal of the key 7 is very small after the tank cap with a lock 1 has been removed from the fuel tank 9.

Figure 9:
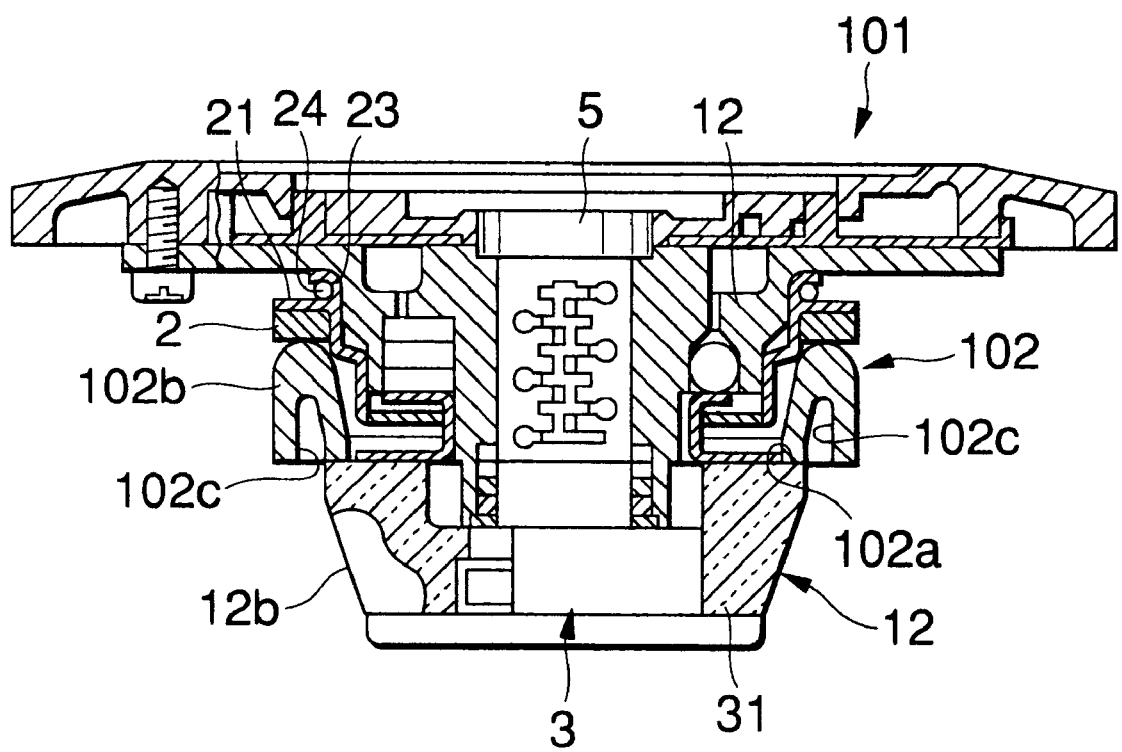
Figure 10:
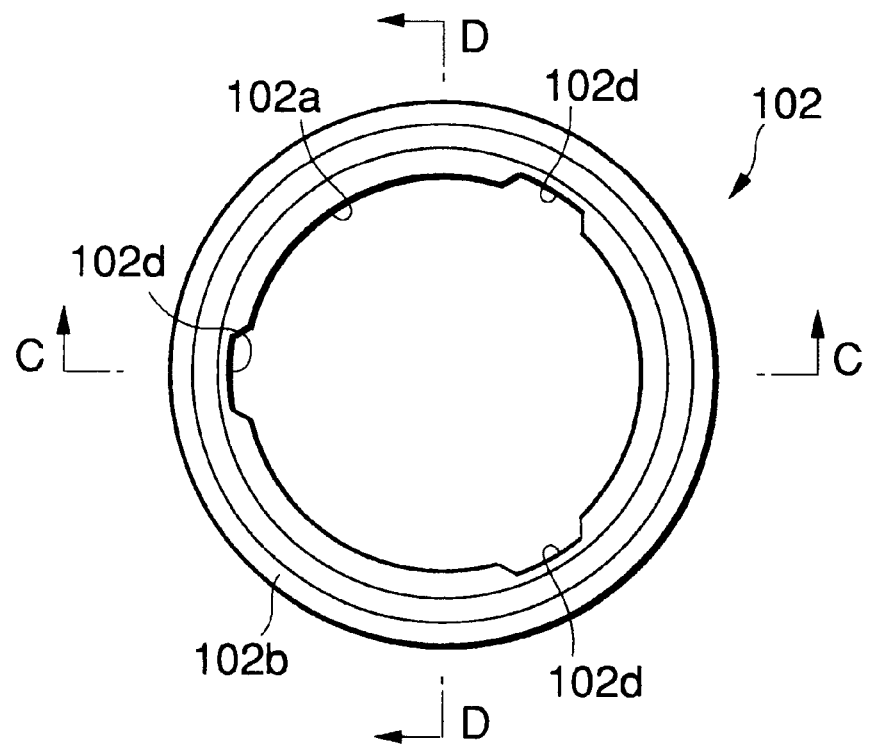
FIG. 10 is a plan view of the temporary assembling cap.
Figure 11:
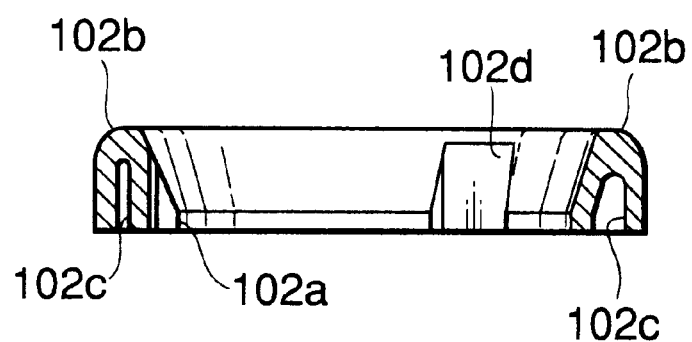
FIG. 11 is a cross-sectional view taken on line C—C in FIG. 10.
Figure 12:
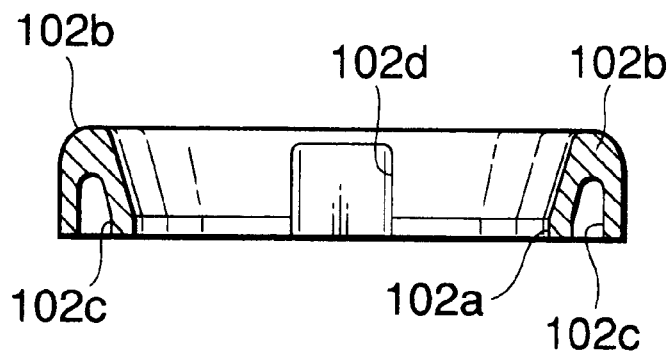
FIG. 12 is a cross-sectional view taken on line D—D in FIG. 10.
Figure 13:
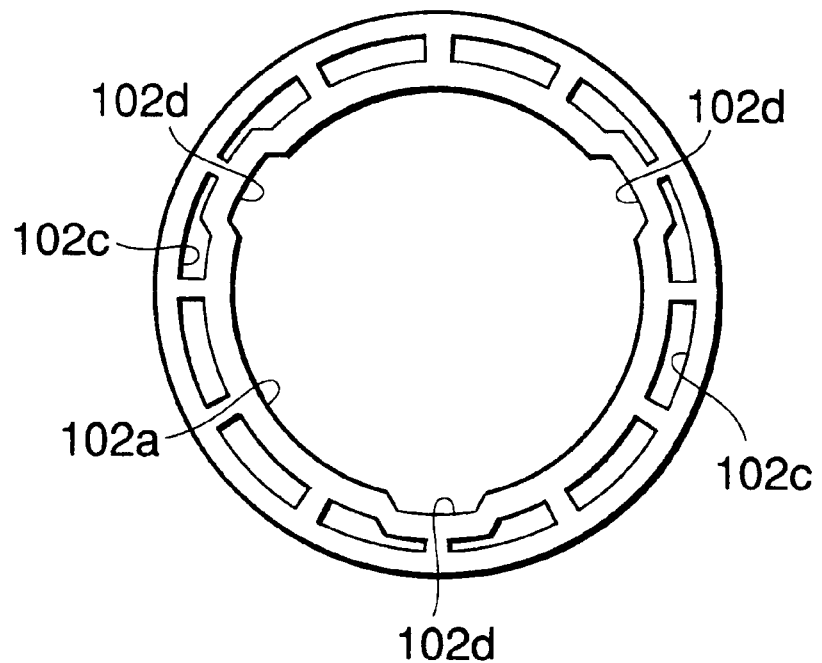
FIG. 13 is a bottom view of the temporary assembling cap.

FIGS. 9 to 13 are views showing another example of the tank cap with a lock of the present invention. FIG. 9 is a cross-sectional view similar to FIG. 4. FIG. 10 is a plan view of the temporary assembling cap. FIG. 11 is a cross-sectional view taken on line C—C in FIG. 10. FIG. 12 is a cross-sectional view taken on line D—D in FIG. 10. FIG. 13 is a bottom view of the temporary assembling cap. The tank cap with a lock 101 of this example is characterized in that a temporary assembling cap 102 is incorporated between the outer circumference of the gasket member 2 and the outer circumference of the locking members 3 of the tank cap with a lock 1.

The temporary assembling cap 102 is attached to the lower body 12b of the pillar-shaped portion 12 of the tank cap with a lock 1. In this case, the temporary assembling cap 102 is formed into the substantially same shape as that of the fuel supply port 91 of the fuel tank 9 by molding a synthetic resin. The temporary assembling cap 102 is composed as follows. As shown in FIGS. 9, 12 and 13, on the upper surface side, there is provided a support portion 102b, the cross-section of which is formed into a substantial arc. Inside the temporary assembling cap 102, there are provided a large number of recesses 102c which are open onto the bottom surface side. At the inner circumferential edge, there are provided three cut-out recesses 102d at regular intervals, wherein these cut-out recesses are formed in the vertical direction.

As shown in FIGS. 8(a)–8(c), a positioning protrusion 2A for positioning the tank cap with a lock relative to the fuel supply port of the fuel tank is provided on the lower body of the tank cap with a lock. When the temporary assembling cap 102 is assembled with the tank cap with a lock 1, the temporary assembling cap 102 is positioned in a circumferential direction in such a manner that the positioning protrusion is coincided with one of the three cut-out recesses.

Note that the number of the cut-out recesses are not limited into three. However, the use of the plural number of cut-out recesses is preferable, because the temporally assembling operation can be conducted smoothly.

This temporary assembling cap 102 is attached to the tank cap with a lock 1 as follows. The temporary assembling cap 102 is at first inserted upwardly from the bottom side of the lower body 12b in a posture in which one of the cut-out recesses 102d is coincided with the positioning protrusion 2A radially projected form the lower body 12b. The temporary assembling cap 102 is moved until the upper surface of the support portion 102b is brought in contact with the lower surface of the gasket 21a. The gasket 21a is pushed upward by the support portion 102b. Therefore, the position of the gasket member 2 with respect to the locking members 3 is changed. At the same time, the locking members 3 are temporarily pushed inside, and the stopper 42 of the slider 4 is raised upward while it follows the gasket member 2 as described before. Accordingly, the locking members 3 are protruded from both sides of the lower body 12b, and the upper surfaces of the locking members 3 are engaged on the bottom surface of the temporary assembling cap 102. In this way, the state illustrated in FIG. 9 can be realized. In this way, the tank cap with a lock 101 is put into the same state in which the tank cap with a lock 101 is attached to the fuel supply port 91 of the fuel tank 9. Accordingly, it is possible to withdraw the key 7 from the lock 5 of the tank cap with a lock 101 (illustrated in FIG. 9).

Next, an example of the method of packing this tank cap with a lock 101 and incorporating this tank cap with a lock 101 into the fuel tank 9 will be explained as follows.

Note that most of parts (mechanical components, electrical components and so on) by which a car or a motorcycle is constituted are respectively manufactured by thousands of parts manufacturer. In this circumstance, many of the tank cap with a lock are usually manufactured by a parts manufacturer.

First, the tank cap with a lock 101 is assembled by a parts manufacturer as mentioned above. In this case, the key 7 is inserted into the key hole 51 of the lock 5, and the temporary assembling cap 102 is incorporated into this tank cap with a lock 101 thus assembled.

When the temporary assembling cap 102 is incorporated into this tank cap with a lock 101, the gasket member 2 is moved in a direction in which the gasket member 2 is separated from the locking members 3, so that it becomes possible to withdraw the key 7 from the key hole 51 of the lock 5. Therefore, when the parts manufacturer delivers the tank cap with a lock 101 and the key 7 to an assembling manufacturer (such as a car manufacturer or a motorcycle manufacturer) by which the fuel tank 9 is assembled, it is possible for the parts manufacture that the tank cap with a lock 101 and the key 7 are separately packed using an appropriate packing (nor shown) while the key 7 is withdrawn from the tank cap with a lock 101, and alternatively that the tank cap with a lock 101 and the key 7 are packed together while they are physically separated but formed into a set.

At the assembling manufacturer, operation is conducted as follows. Into the lock 5 of the tank cap with a lock 101, from which the key has already been withdrawn by the parts manufacturer, the key 7 is inserted. While the key 7 is being turned to the unlocking position, the temporary assembling cap 102 is removed from the pillar-shaped portion 12. Due to the foregoing, the key 7 can not be withdrawn from the lock 5 of the tank cap with a lock 101. When the pillar-shaped portion 12 of the tank cap with a lock 101 is put into the fuel supply port 91 of the fuel tank 9 in the above state, the tank cap with a lock 101 can be incorporated into the fuel tank 9. In this connection, the temporary assembling cap removed by the assembling manufacturer is returned to the parts manufacturer so that it can be reused.

According to the tank cap with a lock 101 of this example, it is possible to pack the tank cap with a lock 101 under the condition that the key 7 is withdrawn from the lock of the tank cap with a lock 101 by using the temporary assembling cap 102. Accordingly, when the tank cap with a lock 101 is being delivered from the parts manufacturer to the assembling manufacturer, parts are not bulky, and it is possible to prevent the tank cap with a lock 101 from being damaged.

Because the key 7 can be removed from the lock 5, there is no possibility that the key 7 is bent during the process of packing or transporting. Therefore, the occurrence of the damage of key 7 can be positively prevented.

In this connection, it should be noted that the present invention is not limited to the above specific example. For example, the rod-shaped slider used in the above example may be replaced with a square bar, and the slider may be formed into a plate-shape having no L-shaped stopper. A moving distance of the slider may not be the same as a moving distance of the gasket member.

The fuel tank to which the tank cap with a lock of the present invention is attached is not limited to a fuel tank in which fuel oil such as gasoline is accommodated. For example, the fuel tank to which the tank cap with a lock of the present invention is attached may be a tank in which alcohol is accommodated. Further, the fuel tank to which the tank cap with a lock of the present invention is attached is not limited to a fuel tank used for a motorcycle. For example, the fuel tank to which the tank cap with a lock of the present invention is attached may be a fuel tank used for other vehicles. Packing described in the present invention includes a case in which the tank cap with a lock and the key are separately accommodated in a box or a delivery box divided by partition plates. Shapes of the pillar-shaped portion and the temporary assembling cap are not limited to the above specific example. They may be appropriately formed in accordance with the shape of the fuel supply port of the fuel tank.

As described in detail above, in the tank cap with a lock according to the invention, it is not easy to withdraw the key from the tank cap with a lock which has been removed from the fuel supply port of the fuel tank. Therefore, there is no possibility that the key is lost while the tank cap is removed from the fuel tank.

In addition to this, in the method of packing the tank cap with a lock according to the present invention, when the temporary assembling cap is incorporated into the tank cap, it become possible to pack the tank cap under the condition that the key is withdrawn from the lock. Accordingly, when the tank cap is delivered, parts are not bulky, and the tank cap is not damaged. Further, deformation is not caused in the key in the process of delivery.

What is claimed is:

1. A tank cap with a lock which is coupled with a fuel supply portion of fuel tank, comprising:

a pillar-shaped portion having an axis;

a gasket member movably mounted, with one limit of travel defining a lower limit position and an opposite limit of travel defining an upper limit position, on said pillar-shaped portion in a direction of said axis for sealing said fuel supply portion;

a locking member movably mounted on said pillar-shaped portion in a transverse direction of said pillar-shaped portion for securing said tank cap with a lock to said fuel tank, said locking member having a moving passage;

a slider provided with a stopper and disposed between said gasket member and said locking member and slidable in said axial direction in conjunction with the movement of the gasket member, said stopper being operative to intrude in said moving passage; and a spring mounted on said pillar-shaped portion for urging said slider against said gasket member;

wherein when said gasket member is near said lower limit position, said locking member has a reduced outward limit of travel from said axis unless said slider is removed from intruding in said moving passage by said gasket member being near said upper limit position simultaneously with an external force pushing said locking member toward said axis.

2. A tank cap with a lock according to claim 1 further comprising:

a temporary assembling cap attached on the outer periphery of said pillar-shaped body disposed between said gasket member and said locking member in the axial direction, wherein the profile of the temporary assembling cap is substantially the same as that of said fuel supply portion of the fuel tank, and wherein the temporary assembling cap is capable of removing said slider from intruding in said moving passage by moving said gasket member near said upper limit position simultaneously with applying an external force to push said locking member toward said axis.

3. The tank cap with a lock according to claim 1, wherein said slider is also provided with a rod-shaped body, and said stopper is made into an L-shape and formed at the center of said rod-shaped body, in which a portion of said L-shaped stopper is intruded into said moving passage of said locking member when said gasket member is near said lower limit position, and the portion of said L-shaped stopper is clamped between said locking member and said pillar-shaped portion when said locking member has a reduced outward limit of travel.

4. The tank cap with a lock according to claim 3, further comprising a reinforcing spring for urging said locking member outwardly in the transverse direction so as to reinforce a clamping force to which said locking member is subjected.

5. The tank cap with a lock according to claim 3 further comprising:

a temporary assembling cap attached to the outer periphery of said pillar-shaped body disposed between said gasket member and said locking member in the axial direction, wherein the profile of the temporary assembling cap is substantially the same as that of said fuel supply port of the fuel tank, and wherein the temporary assembling cap is capable of removing said slider from intruding in said moving passage by moving said gasket member near said upper limit position simultaneously with applying to an external force to push said locking member toward said axis.

6. The tank cap with a lock according to claim 5, further comprising a reinforcing spring for urging said locking member outwardly in the transverse direction so as to reinforce a clamping force to which said locking member is subjected, wherein said locking member is pushed inwardly in the transverse direction against the reinforcing spring so as to remove said slider from intruding in said moving passage by moving said gasket member near said upper limit position simultaneously with applying an external force to push said locking member toward said axis.

7. A method of packing a tank cap with a lock used for sealing a fuel supply port of a fuel tank including: a gasket member for sealing said fuel supply port; a locking member to be engaged with a periphery of the fuel supply port; and a lock, in which a key can be inserted into and withdrawn from the key hole of the lock in accordance with a positional relation between the gasket member and the locking member, said method of packing comprising the steps of:

attaching a temporary assembling cap, the profile of which is substantially the same as that of the fuel supply port of the fuel tank, to a portion between the outer peripheries of the gasket member and the locking member in an axial direction;

withdrawing a key from the key hole of the lock by changing a positional relation of the gasket member with the locking member; and packing the key and the tank cap with the lock in the state in which said key is separated from said tank cap with a lock.

8. A method of packing a tank cap with a lock which is coupled with a fuel supply portion of fuel tank comprising: a pillar-shaped portion; a gasket member movably mounted on said pillar-shaped portion in an axial direction of said pillar-shaped portion for sealing said fuel supply port; a locking member movably mounted on said pillar-shaped portion in a transverse direction of said pillar-shaped portion for securing said tank cap with a lock to said fuel tank; a slider disposed between said gasket member and said locking member and slidably movable in said axial direction in conjunction with the movement of the gasket member; and a spring mounted on said pillar-shaped portion for urging said slider against said gasket member; wherein said slider is provided with a stopper capable of intruding into a moving passage of said locking member, said method comprising the steps of:

preparing a temporary assembling cap the profile of which is substantially the same as that of said fuel supply port of the fuel tank;

attaching said temporary assembling cap to the outer periphery of said pillar-shaped body disposed between said gasket member and said locking member in the axial direction;

withdrawing a key from said tank cap with a lock by changing a positional relation of the gasket member with the locking member; and packing the key thus withdrawn and said tank cap with a lock in the state in which said key is physically separated from said tank cap with a lock.

* * * * *

UNITED STATES PATENT AND TRADEMARK OFFICE
CERTIFICATE OF CORRECTION

PATENT NO. : 5,901,869
DATED : May 11, 1999
INVENTOR(S) : S. Ohmura, et al.

It is certified that error appears in the above-identified patent and that said Letters Patent is hereby corrected as shown below:

On the title page, item

[73]   Assignee:  change "Asahi Densi Co., Ltd." to --Asahi Denso Co., Ltd.--

Signed and Sealed this

Fifteenth Day of February, 2000

Attest:

Q. TODD DICKINSON

*Attesting Officer*             *Commissioner of Patents and Trademarks*